United States Patent
Rosén et al.

(10) Patent No.: US 11,874,014 B2
(45) Date of Patent: Jan. 16, 2024

(54) METHOD AND CONTROLLER FOR CONTROLLING A REVERSIBLE HEAT PUMP ASSEMBLY

(71) Applicant: E.ON SVERIGE AB, Malmo (SE)

(72) Inventors: Per Rosén, Lund (SE); Jacob Skogström, Lomma (SE); Fredrik Rosenqvist, Helsingborg (SE); Bengt Lindoff, Bjärred (SE)

(73) Assignee: E.ON Sverige AB, Malmo (SE)

( * ) Notice: Subject to any disclaimer, the term of this patent is extended or adjusted under 35 U.S.C. 154(b) by 468 days.

(21) Appl. No.: 17/255,105

(22) PCT Filed: Jun. 19, 2019

(86) PCT No.: PCT/EP2019/066151
§ 371 (c)(1),
(2) Date: Dec. 22, 2020

(87) PCT Pub. No.: WO2020/002073
PCT Pub. Date: Jan. 2, 2020

(65) Prior Publication Data
US 2021/0270491 A1   Sep. 2, 2021

(30) Foreign Application Priority Data

Jun. 26, 2018 (EP) .................................. 18179738

(51) Int. Cl.
*F24F 11/67* (2018.01)
*F24D 10/00* (2022.01)

(52) U.S. Cl.
CPC ............ *F24F 11/67* (2018.01); *F24D 10/003* (2013.01); *F24D 2200/12* (2013.01); *F24D 2220/0271* (2013.01)

(58) Field of Classification Search
CPC .... F24F 11/67; F24F 2203/02; F24F 2221/54; F24F 11/83; F24F 11/65; F24F 2140/50;
(Continued)

(56) References Cited

U.S. PATENT DOCUMENTS

2004/0118933 A1*  6/2004  Readio .................... F24D 12/02
                                                       237/2 B
2013/0213072 A1   8/2013  Kawagoe et al.

FOREIGN PATENT DOCUMENTS

EP         0240441 A2      10/1987
EP         2629023         8/2013
(Continued)

OTHER PUBLICATIONS

International Search Report and Written Opinion of PCT/EP2019/066151, dated Sep. 2, 2019, in 12 pages.

*Primary Examiner* — Nelson J Nieves
*Assistant Examiner* — Matthew John Moscola
(74) *Attorney, Agent, or Firm* — Knobbe, Martens, Olson & Bear, LLP

(57) ABSTRACT

A controller configured to selectively set a reversible heat pump assembly (100) in either a heating mode or in a cooling mode is presented. The controller comprising a control circuit (44) configured to: for a time period, determine, using a demand determining function (50), a heating demand for heat from one or more local heating circuits (140) connected to the reversible heat pump assembly (100) and a cooling demand for cold from one or more local cooling circuits (140) connected to the reversible heat pump assembly (100); generate, using a control function (52), a control signal indicative of if the reversible heat pump assembly (100) is to be set in either the heating mode or in the cooling mode, wherein the control function is configured to use the heating demand and the cooling demand as input data; and send, using a transmission function (54), the (Continued)

control signal to a heat pump (110) of the reversible heat pump assembly (100). Also a method for controlling the reversible heat pump assembly (100) is presented.

23 Claims, 4 Drawing Sheets

(58) Field of Classification Search
CPC ............ F24D 19/1015; F24D 19/1039; F24D 19/1087; F24D 10/003; F24D 2200/12; F24D 2220/0271; F24D 10/00; F24D 19/1012; F24D 19/1036; Y02B 30/17; Y02B 30/70; Y02E 20/14; F25B 2500/02; F25B 2313/0231
See application file for complete search history.

(56) References Cited

FOREIGN PATENT DOCUMENTS

| EP | 3270069 | | 1/2018 |
|---|---|---|---|
| EP | 3299734 | A1 | 3/2018 |
| WO | WO 2010/145040 | A1 | 12/2010 |

\* cited by examiner

METHOD AND CONTROLLER FOR CONTROLLING A REVERSIBLE HEAT PUMP ASSEMBLY

FIELD OF THE INVENTION

The invention relates to a method for controlling a reversible heat pump assembly. Also a controller for controlling a reversible heat pump assembly is presented.

BACKGROUND OF THE INVENTION

Nearly all large developed cities in the world have at least two types of energy grids incorporated in their infrastructures; one grid for providing electrical energy and one grid for providing space heating and hot tap water preparation. Today a common grid used for providing space heating and hot tap water preparation is a gas grid providing a burnable gas, typically a fossil fuel gas. The gas provided by the gas grid is locally burned for providing space heating and hot tap water. An alternative for the gas grid for providing space heating and hot tap water preparation is a district heating grid. Also the electrical energy of the electrical energy grid may be used for space heating and hot tap water preparation. Also the electrical energy of the electrical energy grid may be used for space cooling. The electrical energy of the electrical energy grid is further used for driving refrigerators and freezers.

Accordingly, traditional building heating and cooling systems use primary high grade energy sources such as electricity and fossil fuels or an energy source in the form of industrial waste heat to provide space heating and/or cooling, and to heat or cool water used in the building. Furthermore, it has been increasingly common to also install a district cooling grid in cities for space cooling. The process of heating or cooling the building spaces and water converts this high grade energy into low grade waste heat with high entropy which leaves the building and is returned to the environment.

Hence, there is a need for improvements in how to provide heating and cooling to a city.

SUMMARY OF THE INVENTION

It is an object of the present invention to solve at least some of the problems mentioned above.

According to a first aspect a controller configured to selectively set a reversible heat pump assembly in either a heating mode or in a cooling mode is provided. The controller comprising a control circuit configured to:

for a time period, determine, using a demand determining function, a heating demand to be delivered by the reversible heat pump assembly and a cooling demand for cold to be delivered by the reversible heat pump assembly;

generate, using a control function, a control signal indicative of if the reversible heat pump assembly is to be set in either the heating mode or in the cooling mode, wherein the control function is configured to use the heating demand and the cooling demand as input data; and send, using a transmission function, the control signal to a heat pump of the reversible heat pump assembly.

The wording "selectively set in either a heating mode or a cooling mode" should be construed as the reversible heat pump assembly is at one point in time set in the heating mode and at another point in time set in the cooling mode.

The reversible heat pump assembly is simple to connect to the thermal energy circuit being part of a district thermal energy distribution system. The reversible heat pump assembly provide for the use of the same assembly for delivering both heating and cooling. At one point in time the reversible heat pump assembly may be set in the heating mode and at another point in time the reversible heat pump assembly may be set in the cooling mode. By the present reversible heat pump assembly, the utilization of the heat pump assembly may be increased as compared with a dedicated heating or cooling heat pump assembly. The construction of a heating/cooling system in a building may be simplified since only one single heat pump assembly is needed. Further, the controlling of a heating/cooling system in a building may be simplified since only one single heat pump assembly needs to be controlled. The present reversible heat pump assembly may further provide scalability, assume that a client at first only is interested in heating, at a later point in time the same client may start getting cooling delivered as well from the same heat pump assembly. Hence, no new heat pump assembly needs to be installed at the client.

The heating demand may comprise time resolved information pertaining to amount of heating desired by the one or more local heating circuits.

The cooling demand may comprise time resolved information pertaining to amount of cooling desired by the one or more local cooling circuits.

The heating demand may be received from one or more local heating circuits connected to the reversible heat pump assembly.

The cooling demand is received from one or more local cooling circuits connected to the reversible heat pump assembly.

The control circuit may further be configured to identify, using an evaluation function, simultaneous desires of setting the reversible heat pump assembly in both the heating mode and the cooling mode, wherein the evaluation function is configured to use the heating demand and the cooling demand as input data;

wherein the control function is further configured to use the identified simultaneous desires of setting the reversible heat pump assembly (100) in both the heating mode and the cooling mode when generating the control signal.

The control circuit may further be configured to:

for the time period, determine, using a duty cycle function, a heating duty cycle for the heating mode and a cooling duty cycle for the cooling mode, wherein the duty cycle function is configured to use the heating demand and the cooling demand as input data.

The control function may further be configured to, in response to the heating duty cycle together with the cooling duty cycle being below a first threshold, delay, in time, the setting of the reversible heat pump assembly in the cooling mode, in case of the control signal is already indicative of the reversible heat pump assembly is to be set in the heating mode, or delay, in time, the setting of the reversible heat pump assembly (100) in the heating mode, in case of the control signal is already indicative of the reversible heat pump assembly is to be set in the cooling mode.

The control function may further be configured to, in response to the heating duty cycle together with the cooling duty cycle being above a second threshold, generate the control signal to comprise information to temporarily set the heat pump to deliver heat at an output greater than an output being indicated by the heating demand, thereby reducing the heating duty cycle and/or to comprise information to temporarily set the heat pump to deliver cold at an output greater than an output being indicated by the cooling demand, thereby reducing the cooling duty cycle.

The control function may further be configured to generate the control signal to comprise information pertaining to:
upon the control signal comprises information pertaining to setting the reversible heat pump assembly in the heating mode, setting a reversing valve of the heat pump such that refrigerant of the heat pump is flowing from a first side coil to a second side coil, upon the control signal comprises information pertaining to setting the reversible heat pump assembly in the cooling mode, setting the reversing valve of the heat pump such that refrigerant of the heat pump is flowing from the second side coil to the first coil.

The transmission function may further be configured to: send the control signal to a first side inlet valve assembly of the reversible heat pump assembly, the first side inlet valve assembly comprising: a heat pump connection connected to a first side inlet of the heat pump; a hot conduit connection connected to a hot conduit of a thermal energy grid, the hot conduit being configured to allow heat transfer liquid of a first temperature to flow therethrough; and a cold conduit connection connected to a cold conduit of the thermal energy grid, the cold conduit being configured to allow heat transfer liquid of a second temperature to flow therethrough, the second temperature being lower than the first temperature; and
send the control signal to a second side outlet valve assembly of the reversible heat pump assembly, the second side outlet valve assembly comprising: a heat pump connection to a second side outlet of the heat pump; a heating circuit connection connected to the one or more heating circuits; and a cooling circuit connection connected to the one or more cooling circuits.

The control function may further be configured to generate the control signal to comprise information pertaining to:
upon the control signal comprises information pertaining to setting the reversible heat pump assembly in the heating mode, setting the first side inlet valve assembly to fluidly connect the hot conduit connection and the heat pump connection; and
upon the control signal comprises information pertaining to setting the reversible heat pump assembly in the cooling mode, setting the second side outlet valve assembly to fluidly connect the heat pump connection and the heating circuit connection.

The control function may further be configured to generate the control signal to comprise information pertaining to:
upon the control signal comprises information pertaining to setting the reversible heat pump assembly in the heating mode, setting the first side inlet valve assembly to fluidly disconnect the cold conduit connection from the heat pump connection; and
upon the control signal comprises information pertaining to setting the reversible heat pump assembly in the cooling mode, setting the second side outlet valve assembly to fluidly disconnect the heat pump connection from the cooling circuit connection.

The below mentioned features of the method, when applicable, apply to this first aspect as well. In order to avoid undue repetition, reference is made to the below.

According to a second aspect a method for controlling a reversible heat pump assembly is presented. The reversible heat pump assembly comprising:
a heat pump having a first side and a second side, the heat pump being configured to transfer heat from the first side to the second side or vice versa,
wherein the reversible heat pump assembly is configured to be selectively set in either a heating mode or a cooling mode,
wherein in the heating mode:
the heat pump is configured to transfer heat from the first side to the second side;
wherein in the cooling mode:
the heat pump is configured to transfer heat from the second side to the first side,
wherein the method comprises:
for a time period, determining a heating demand for heat to be delivered by the reversible heat pump assembly and a cooling demand for cold to be delivered by the reversible heat pump assembly,
controlling, based on the heating demand and the cooling demand, the setting of the reversible heat pump assembly in either the heating mode or the cooling mode.

The heat pump may be configured to allow heat transfer liquid of either one of one or more local heating circuits or one of one or more local cooling circuits to flow through the second side.

The heat pump may be configured to allow heat transfer liquid from a thermal energy grid to flow through the first side, and to allow heat transfer liquid of either one or more local heating circuits or one or more local cooling circuits to flow through the second side.

In the heating mode, heat transfer liquid may be allowed to flow from a hot conduit of the thermal energy grid through the first side and to a cold conduit of the thermal energy grid.

In the cooling mode, heat transfer liquid may be allowed to flow from the cold conduit of the thermal energy grid through the first side and to the hot conduit of the thermal energy grid.

The heating demand may comprise time resolved information pertaining to amount of heating desired by the one or more local heating circuits. The cooling demand may comprise time resolved information pertaining to amount of cooling desired by the one or more local cooling circuits.

The heating demand may be received from one or more local heating circuits connected to the reversible heat pump assembly. The cooling demand may be received from one or more local cooling circuits connected to the reversible heat pump assembly.

The method may further comprise:
identifying, based on the heating demand and the cooling demand, simultaneous desires of setting the reversible heat pump assembly in both the heating mode and the cooling mode;
wherein the act of controlling is further based on the identified simultaneous desires.

The act of controlling may comprise running the reversible heat pump assembly in either the heating mode or in the cooling mode for a running time of at least a predetermined number times a mode change-over time. The mode change-over time is the time it takes for the reversible heat pump assembly to change from the heating mode to the cooling mode or vice versa. Typical change-over times are in the order of minutes, e.g. 1-5 minutes. The predetermined number may be set to be in the range of 5-10. By this the time spent on changing the mode of the reversible heat pump assembly may be limited. Hence, the degree of utilization of the reversible heat pump assembly may be increased.

The method may further comprise:
determining, for the time period and based on the heating demand, a heating duty cycle for the heating mode;
determining, for the time period and based on the cooling demand, a cooling duty cycle for the cooling mode.

The act of controlling may comprise, in response to the heating duty cycle together with the cooling duty cycle being below a first threshold, delaying, in time, the setting of the reversible heat pump assembly in the cooling mode, in case of the reversible heat pump assembly is already in the heating mode, or delaying, in time, the setting of the reversible heat pump assembly in the heating mode, in case of the reversible heat pump assembly is already in the cooling mode.

The act of controlling may comprise, in response to the heating duty cycle together with the cooling duty cycle being above a second threshold, temporarily setting the heat pump to deliver heat at an output greater than an output being indicated by the heating demand, thereby reducing the heating duty cycle and/or temporarily setting the heat pump to deliver cold at an output greater than an output being indicated by the cooling demand, thereby reducing the cooling duty cycle.

The method may further comprise in response to identified simultaneous desires, temporarily setting the heat pump to deliver heat at an output greater than an output indicated by the heating demand, thereby reducing the heating duty cycle and/or temporarily setting the heat pump to deliver cold at an output greater than an output indicated by the cooling demand, thereby reducing the cooling duty cycle.

The method may further comprise associating a heating priority level to the heating demand and a cooling priority level to the cooling demand, wherein the act of controlling is further based on the heating and cooling priority levels.

The act of associating a heating priority level to the heating demand may comprise associating a specific heating priority level to a specific heating demand.

The act of associating a cooling priority level to the cooling demand may comprise associating a specific cooling priority level to a specific cooling demand.

The above mentioned features of the controller, when applicable, apply to this second aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

These and other aspects of the present invention will now be described in more detail, with reference to the appended drawings showing embodiments of the invention. The figures are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
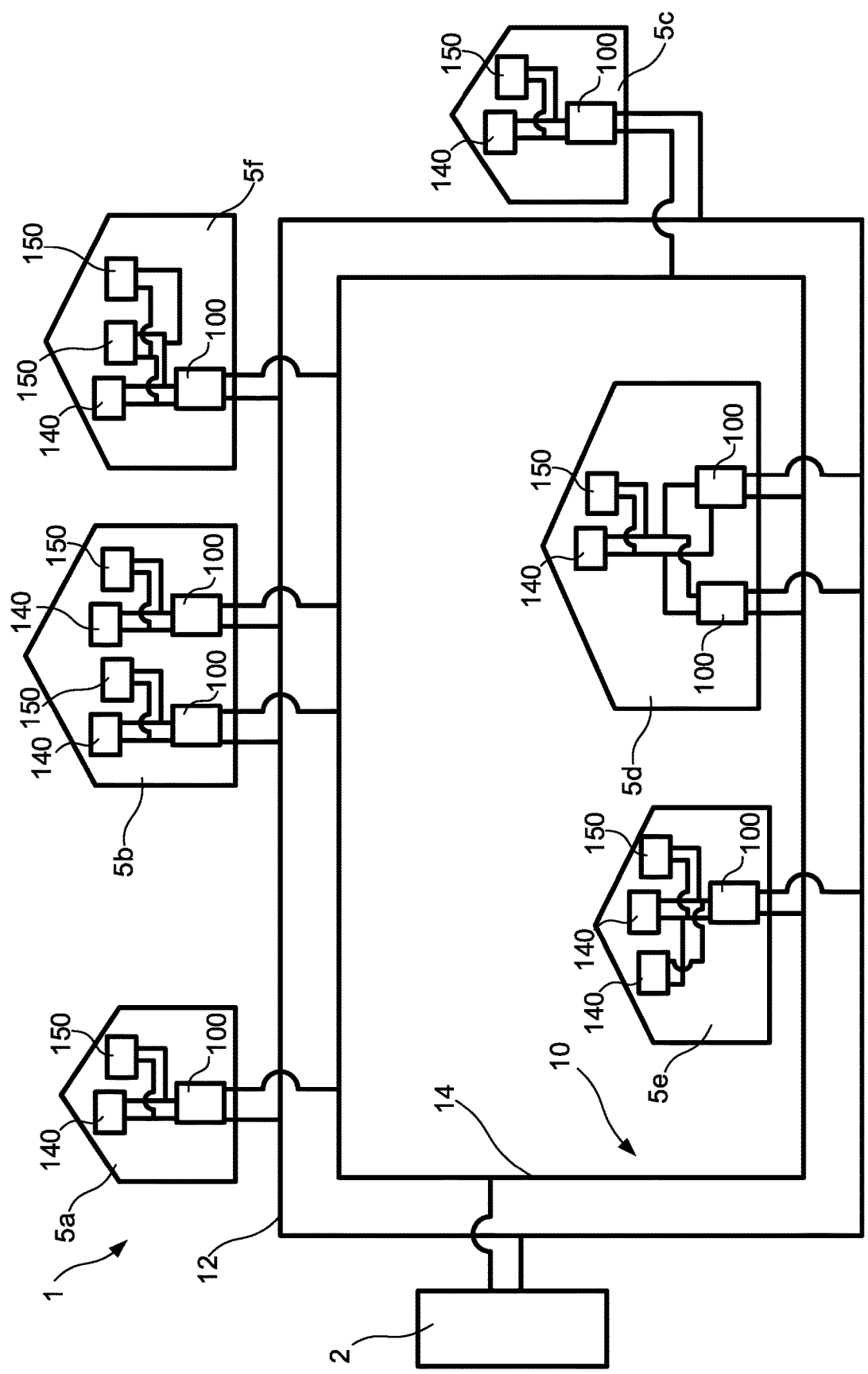
FIG. 1 is a schematic diagram of a district thermal energy distribution system.

In FIG. 1 a district thermal energy distribution system 1 is illustrated. The district thermal energy distribution system 1 comprises a thermal energy circuit 10 and a plurality of buildings 5. The thermal energy circuit 10 is configured to interconnect the buildings 5 such that thermal energy in the form of heating and/or cooling may be distributed to and/or from the buildings 5. Hence, the thermal energy circuit 10 may be seen as a district thermal energy circuit. The plurality of buildings 5 are thermally coupled to the thermal energy circuit 10. The thermal energy circuit 10 is arranged to circulate and store thermal energy in heat transfer liquid flowing through the thermal energy circuit 10.

The heat transfer liquid of the thermal energy circuit 10 may comprise water. However, other heat transfer liquids may alternatively be used. Some non-limiting examples are ammonia, oils, alcohols and anti-freezing liquids, such as glycol. The heat transfer liquid may also comprise a mixture of two or more of the heat transfer liquids mentioned above. A specific mixture to be used is water mixed with an anti-freezing liquid.

The thermal energy circuit 10 comprises two conduits 12, 14 for allowing flow of heat transfer liquid therethrough. The temperature of the heat transfer liquid of the two conduits 12, 14 is set to be different. A hot conduit 12 in the thermal energy circuit 10 is configured to allow heat transfer liquid of a first temperature to flow therethrough. A cold conduit 14 in the thermal energy circuit 10 is configured to allow heat transfer liquid of a second temperature to flow therethrough. The second temperature is lower than the first temperature.

In case heat transfer liquid is water (possibly with added anti-freezing liquid), a suitable temperature range for the hot heat transfer liquid is between 5 and 45° C. and a suitable temperature range for the cold heat transfer liquid is between 0 and 40° C. A suitable temperature difference between the first and second temperatures is in the range of 5-16° C., preferably in the range of 7-12° C., more preferably 8-10° C.

Preferably, the system is set to operate with a sliding temperature difference which varies depending on the climate. Preferably, the sliding temperature difference is fixed. Hence, the temperature difference may be set to momentarily slide with a fixed temperature difference.

The hot conduit 12 and the cool conduit 14 are separate. The hot conduit 12 and the cool conduit 14 may be parallelly arranged. The hot conduit 12 and the cool conduit 14 may be arranged as closed loops of piping. The hot conduit 12 and the cool conduit 14 are fluidly interconnected at the buildings 5 for allowing of thermal energy transfer to and from the buildings 5. This will be discussed more in detail further below.

The two conduits 12, 14 of the thermal energy circuit 10 may be formed by plastic, composite, concrete, or metal pipes. According to one embodiment High Density Polyethylene (HDPE) pipes may be used. The pipes may be single wall pipes. The pipes may be uninsulated. According to one embodiment the thermal energy circuit 10 is mainly arranged in the ground. The ground will be used as thermal inertia of the thermal energy circuit 10. Hence, insulation of the piping gives no extra value. Exceptions are installation in cities with a very warm climate or cities with very cold climate. Here the inertia of the ground may be more harmful than good during critical parts of the year. Here insulation on one or both pipes of the piping may be needed.

According to one embodiment the two conduits 12, 14 of the thermal energy circuit 10 are dimensioned for pressures up to 1 MPa (10 bar). According to other embodiments the two conduits 12, 14 of the thermal energy circuit 10 may be dimensioned for pressures up to 0.6 MPa (6 bar) or for pressures up to 1.6 MPa (16 bar).

The district thermal energy distribution system 1 may comprise a thermal server plant 2. The thermal server plant 2 functions as an external thermal source and/or thermal sink. The function of the thermal server plant 2 is to maintain the temperature difference between the hot and cold conduits 12, 14 of the thermal energy circuit 10. That is, the thermal server plant 2 may be used for balancing the district thermal energy distribution system 1 such that when the thermal energy circuit 10 reaches a temperature end point the thermal server plant 2 is arranged to inhale or exhale thermal energy to/from the thermal energy circuit 10. In winter time, when there is higher probability that the hot conduit 12 reaches its' lowest temperature end point, the thermal server plant 2 is used for adding thermal energy to the thermal energy circuit 10. In summer time, when there is higher probability that the cold conduit reaches its' highest temperature end point, the thermal server plant 2 is used to subtract thermal energy from the thermal energy circuit 10.

A building 5 comprises at least one reversible heat pump assembly 100. One specific building 5 may comprise more than one reversible heat pump assembly 100.

The reversible heat pump assembly 100 is configured to be connected to the thermal energy circuit 10. The reversible heat pump assembly 100 is configured to be connected to a heating circuit 140. The reversible heat pump assembly 100 is configured to be connected to a cooling circuit 150.

The heating circuit 140 may be a local heating circuit configured within a building 5. The heating circuit 140 is configured to allow heat transfer liquid to flow therethrough. The heating circuit 140 may be one or more of a comfort heating system, a process heating system, and hot tap water production system.

The cooling circuit 140 may be a local cooling circuit configured within a building 5. The cooling circuit 150 is configured to allow heat transfer liquid to flow therethrough. The cooling circuit 150 may be one or more of a comfort cooling system, a process cooling system, a refrigeration system, and a freezing system.

The reversible heat pump assembly 100 may be set to operate in either a heating mode or a cooling mode. Hence, a specific reversible heat pump assembly 100 may selectively be set in either the heating mode or the cooling mode.

In the heating mode the reversible heat pump assembly 100 is acting as a thermal sink. Hence, the reversible heat pump assembly 100 is arranged to remove thermal energy from the thermal energy circuit 10. Or in other words, the reversible heat pump assembly 100 is arranged to transfer thermal energy from heat transfer liquid of the thermal energy circuit 10 to heat transfer liquid of the heating circuit 140. This is achieved by transfer of thermal energy from heat transfer liquid taken from the hot conduit 12 to heat transfer liquid of the heating circuit 140, such that heat transfer liquid returned to the cold conduit 14 has a temperature lower than the first temperature and preferably a temperature equal to the second temperature.

Hence, a reversible heat pump assembly 100 may be installed in a building 5 for acting as a provider for heat to one or more local heating circuits 140. As a non-limiting example, a local heating circuit 140 may be arranged to deliver comfort heating, process heating or hot tap hot water preparation. Alternatively, or in combination, the local heating circuit 140 may deliver pool heating or ice- and snow purging. Hence, the reversible heat pump assembly 100, upon being set in the heating mode, is configured to derive heat from heat transfer liquid of the hot conduit 12 and to create a cooled heat transfer liquid flow into the cold conduit 14. Hence, upon being set in the heating mode, the reversible heat pump assembly 100 fluidly interconnects the hot and cool conduits 12, 14 such that hot heat transfer liquid can flow from the hot conduit 12 through the reversible heat pump assembly 100 and then into the cool conduit 14 after thermal energy in the heat transfer liquid has been consumed by the reversible heat pump assembly 100. Upon being set in the heating mode, the reversible heat pump assembly 100 operates to draw thermal energy from the hot conduit 12 to heat the heating circuit 140 and then deposits the cooled heat transfer liquid into the cool conduit 14.

In the cooling mode the reversible heat pump assembly 100 is acting as a thermal source. Hence, the reversible heat pump assembly 100 is arranged to deposit thermal energy to the thermal energy circuit 10. Or in other words, the reversible heat pump assembly 100 is arranged to transfer thermal energy from heat transfer liquid of the cooling circuit 150 to heat transfer liquid of the thermal energy circuit 10. This is achieved by transfer of thermal energy from heat transfer liquid of the cooling circuit 150 to heat transfer liquid taken from the cold conduit 12, such that heat transfer liquid returned to the hot conduit 12 has a temperature higher than the second temperature and preferably a temperature equal to the first temperature.

Hence, a reversible heat pump assembly 100 may be installed in a building 5 for acting as a provider for cooling to one or more local cooling circuits 150. As a non-limiting example a local cooling circuit 150 may be arranged to deliver comfort cooling, process cooling or cooling for freezers and refrigerators. Alternatively, or in combination, the local cooler may deliver cooling for ice rinks and ski centers or ice- and snow making. Hence, the reversible heat pump assembly 100, upon being set in the cooling mode, is configured to derive cooling from heat transfer liquid of the cold conduit 14 and to create a heated heat transfer liquid flow into the hot conduit 12. Hence, upon being set in the cooling mode, the reversible heat pump assembly 100 fluidly interconnects the cold and hot conduits 14, 12 such that cold heat transfer liquid can flow from the cold conduit 14 through the reversible heat pump assembly 100 and then into the hot conduit 12 after thermal energy has been deposited into the heat transfer liquid by the reversible heat pump assembly 100. The reversible heat pump assembly 100 operates to extract heat from the cooling circuit 150 and deposits that extracted heat into the hot conduit 12.

A specific reversible heat pump assembly 100 may be connected to one heating circuit 140 and to one cooling circuit 150. This is e.g. illustrated in buildings 5a and 5c of FIG. 1.

A building may comprise a plurality of reversible heat pump assemblies 100 each being connected to one heating circuit 140 and to one cooling circuit 150. This is e.g. illustrated in buildings 5b of FIG. 1.

A plurality of reversible heat pump assemblies 100 may be connected to one heating circuit 140 and to one cooling circuit 150. This is e.g. illustrated in buildings 5d of FIG. 1. If so, one of the plurality of reversible heat pump assemblies 100 may be set in the heating mode for providing heating to the one heating circuit 140 and another one of the plurality of reversible heat pump assemblies 100 may be set in the cooling mode for providing cooling to the one cooling circuit 150. Alternatively, two or more of the plurality of reversible heat pump assemblies 100 may be set in the heating mode for providing heating to the one heating circuit 140. Yet alternatively, two or more of the plurality of reversible heat pump assemblies 100 may be set in the cooling mode for providing cooling to the one cooling circuit 150. Further alternatively, all of the plurality of reversible heat pump assemblies 100 may be set in the heating mode for providing heating to the one heating circuit 140. Alternatively, all of the plurality of reversible heat pump assemblies 100 may be set in the cooling mode for providing cooling to the one cooling circuit 150. At a first specific point in time one of the alternative settings of the plurality of reversible heat pump assemblies 100 indicated above may be used, at another specific point in time another one of the alternative settings of the plurality of reversible heat pump assemblies 100 indicated above may be used. Hence, depending of the heating and cooling needs of the heating circuit 140 and the cooling circuit 150 the plurality of reversible heat pump assemblies 100 may be set differently.

A specific reversible heat pump assembly 100 may be connected to a plurality of heating circuits 140. This is e.g. illustrated in buildings 5e of FIG. 1. If so, the reversible heat pump assembly 100 may be configured to deliver heat to one of the plurality of heating circuits 140 at a first point in time and to another one of the heating circuits 140 at second point in time, the second point in time being different from the first point in time.

A specific reversible heat pump assembly 100 may be connected to a plurality of cooling circuits 150. This is e.g. illustrated in buildings 5f of FIG. 1. If so, the reversible heat pump assembly 100 may be configured to deliver cooling to one of the plurality of cooling circuits 150 at a first point in time and to another one of the cooling circuits 150 at second point in time, the second point in time being different from the first point in time.

Figure 2:
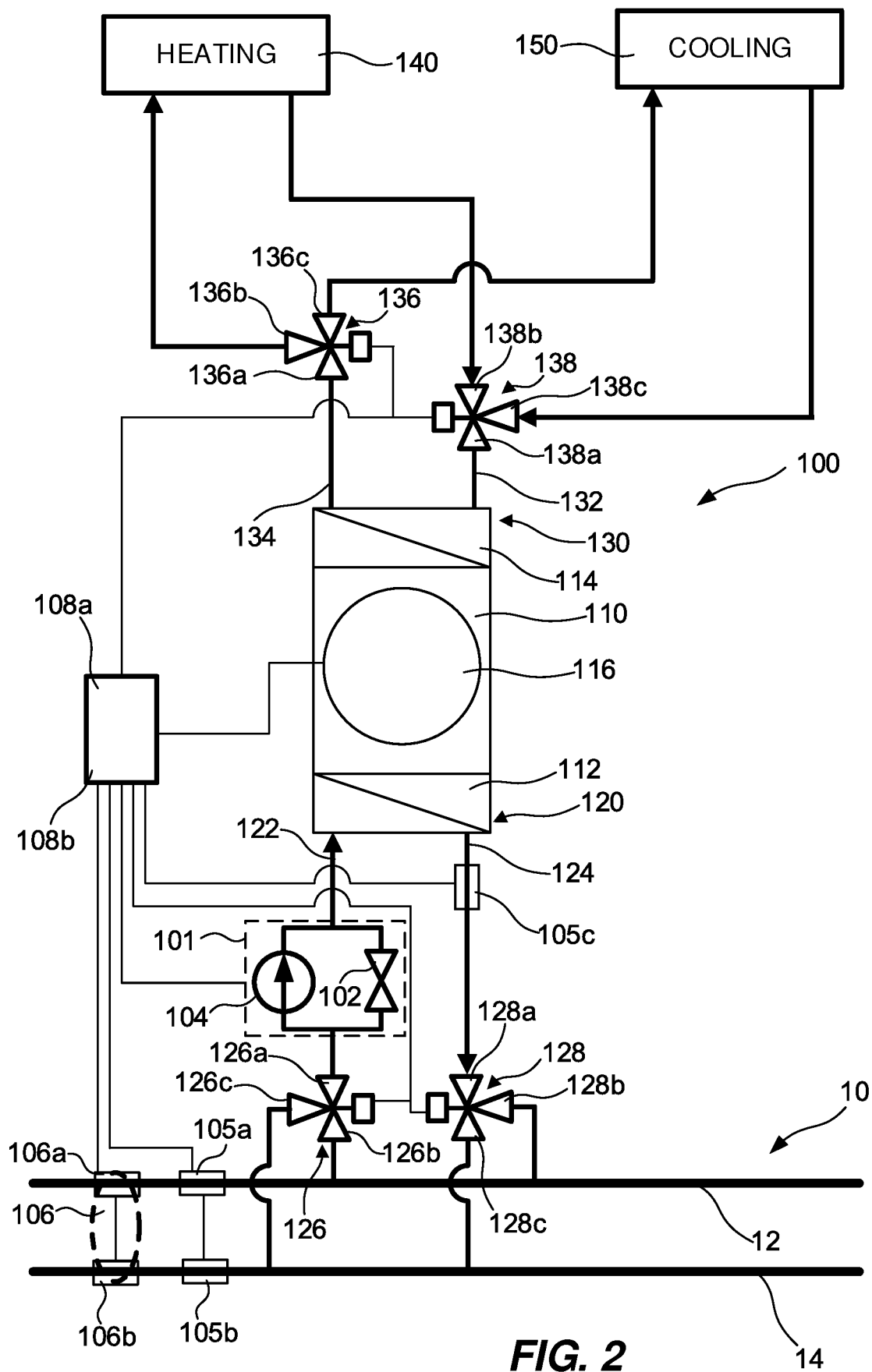
FIG. 2 is a schematic diagram of a reversible heat pump assembly connected to a thermal energy grid, to a heating circuit, and to a cooling circuit.

With reference to FIG. 2 the function of a reversible heat pump assembly 100 will now be discussed. The reversible heat pump assembly 100 comprises a heat pump 110 having a first side 120 and a second side 130, a first side inlet valve assembly 126, a second side outlet valve assembly 136.

The first side 120 of the heat pump 110 comprises a first side inlet 122 and a first side outlet 124 allowing heat transfer liquid to flow through the first side 120 of the heat pump 110. Hence, the heat pump 110 is configured such that heat transfer liquid of the district thermal energy distribution system 1 is allowed flow through the first side 120 of the heat pump 110 via the first side inlet 122 and the first side outlet 124.

The second side 130 of the heat pump 110 comprises a second side inlet 132 and a second side outlet 134 allowing heat transfer liquid to flow through the second side 130 of the heat pump 110. Hence, the heat pump 110 is configured such that heat transfer liquid of the heating circuit 140 and/or the cooling circuit 150 is allowed flow through the second side 130 of the heat pump 110 via the second side inlet 132 and the second side outlet 134.

The first side inlet valve assembly 126 comprises a heat pump connection 126a connected to the first side inlet 122, a hot conduit connection 126b arranged to be connected to the hot conduit 12 of a thermal energy grid 10, and a cold conduit connection 126c arranged to be connected to the cold conduit 14 of the thermal energy grid 10. All the connections 126a-c of the first side inlet valve assembly 126 are configured to fluidly connect the first side inlet valve assembly 126 to the respective device/conduit. Any such connection may be made using piping. Hence, the heat pump connection 126a is configured to fluidly connect the first side inlet valve assembly 126 with the first side inlet 122 of the heat pump 110. The hot conduit connection 126b is arranged to fluidly connect the first side inlet valve assembly 126 with the hot conduit 12 of a thermal energy grid 10. The cold conduit connection 126c is arranged to fluidly connect the first side inlet valve assembly 126 with the cold conduit 14 of a thermal energy grid 10.

The second side outlet valve assembly 136 comprises a heat pump connection 136a connected to the second side outlet 134, a heating circuit connection 136b arranged to be connected to a heating circuit 140, and a cooling circuit connection 136c arranged to be connected to a cooling circuit 150. All the connections 136a-c of the second side outlet valve assembly 136 are configured to fluidly connect the second side outlet valve assembly 136 to the respective device/circuit. Any such connection may be made using piping. Hence, the heat pump connection 136a is configured to fluidly connect the second side outlet valve assembly 136 with the second side outlet 134 of the heat pump 110. The heating circuit connection 136b is arranged to fluidly connect the second side outlet valve assembly 136 with the heating circuit 140. The cooling circuit connection 136c is arranged to fluidly connect the second side outlet valve assembly 136 with the cooling circuit 150.

The reversible heat pump assembly 100 is configured to be selectively set in either a heating mode or a cooling mode. Hence, at a specific point in time the reversible heat pump assembly 100 may be set in one of the heating mode or a cooling mode.

Upon the reversible heat pump assembly 100 is set in the heating mode, the heat pump 110 is configured to transfer heat from the first side 120 to the second side 130. Upon the reversible heat pump assembly 100 is set in the heating mode, the first side inlet valve assembly 126 is configured to fluidly connect the hot conduit connection 126b and the heat pump connection 126a. Upon the reversible heat pump assembly 100 is set in the heating mode, the second side outlet valve assembly 136 is configured to fluidly connect the heat pump connection 136a and the heating circuit connection 136b. Upon the reversible heat pump assembly 100 is set in the heating mode, the first side inlet valve assembly 126 may be configured to fluidly disconnect the cold conduit connection 126c from the heat pump connection 126a. Upon the reversible heat pump assembly 100 is set in the heating mode, the second side outlet valve assembly 136 may be configured to fluidly disconnect the heat pump connection 136a from the cooling circuit connection 136c.

Upon the reversible heat pump assembly 100 is set in the cooling mode, the heat pump 110 is configured to transfer heat from the second side 130 to the first side 120. Upon the reversible heat pump assembly 100 is set in the cooling mode, the first side inlet valve assembly 126 is configured to fluidly connect the cold conduit connection 126c and the heat pump connection 126a. Upon the reversible heat pump assembly 100 is set in the cooling mode, the second side outlet valve assembly 136 is configured to fluidly connect the heat pump connection 136a and the cooling circuit connection 136c. Upon the reversible heat pump assembly 100 is set in the cooling mode, the first side inlet valve assembly 126 may be configured to fluidly disconnect the hot conduit connection 126b from the heat pump connection 126a. Upon the reversible heat pump assembly 100 is set in the cooling mode, the second side outlet valve assembly 136 may be configured to fluidly disconnect the heat pump connection 136a from the heating circuit connection 136b.

Hence, the heat pump 110 is configured to transfer heat from the first side 120 to the second side 130 or vice versa. Such a heat pump 110 may be referred to as a reversible heat pump. The reversible heat pump may comprise a first side coil 112, a second side coil 114 and a reversing valve 116.

Upon the heat pump assembly 100 is set in the heating mode the first side coil 112 is configured to work as an evaporator, the second side coil 114 is configured to work as a condenser, and the reversing valve 116 is set such that refrigerant of the heat pump 110 is flowing from the first side coil 112 to the second side coil 114. Hence, the refrigerant flowing from the first side coil 112 (acting as an evaporator) carries thermal energy from thermal energy grid 10 to the second side 130 of the heat pump 110. Vapor temperature is augmented within the heat pump 110 by compressing it. The second side coil 114 (acting as a condenser) then transfers thermal energy (including energy from the compression) to the second side outlet 134 of the heat pump 110. The transferred heat will heat heat transfer liquid of the heating circuit 140. The refrigerant is then allowed to expand, and hence cool, and absorb heat from the thermal energy grid 10 in the first side coil 112 (acting as an evaporator), and the cycle repeats.

Upon the heat pump assembly 100 is set in the cooling mode the second side coil 114 is configured to work as an evaporator, the first side coil 112 is configured to work as a condenser, and the reversing valve 116 is set such that refrigerant of the heat pump 110 is flowing from the second side coil 114 to the first side coil 112. Hence, upon the heat pump assembly 100 is set in the cooling mode the cycle is similar to what was discussed above in connection with the heat pump assembly 100 is set in the heating mode, but the first side coil 112 is now the condenser and the second side coil 114 (which reaches a lower temperature) is the evaporator.

The heat pump assembly 100 may further comprise a first side outlet valve assembly 128. The first side outlet valve assembly 128 comprises a heat pump connection 128a connected to the first side outlet 124, a hot conduit connection 128b arranged to be connected to a hot conduit 12 of a thermal energy grid 10, and a cold conduit connection 128c arranged to be connected to a cold conduit 14 of the thermal energy grid 10. All the connections 128a-c of the first side outlet valve assembly 128 are configured to fluidly connect the first side outlet valve assembly 128 to the respective device/conduit. Any such connection may be made using piping. Hence, the heat pump connection 128a is configured to fluidly connect the first side outlet valve assembly 128 with the first side outlet 124 of the heat pump 110. The hot conduit connection 128b is arranged to fluidly connect the first side outlet valve assembly 128 with the hot conduit 12 of a thermal energy grid 10. The cold conduit connection 128c is arranged to fluidly connect the first side outlet valve assembly 128 with the cold conduit 14 of a thermal energy grid 10. Upon the reversible heat pump assembly 100 is set in the heating mode, the first side outlet valve assembly 128 is configured to fluidly connect the heat pump connection 128a and the cold conduit connection 126c. Upon the reversible heat pump assembly 100 is set in the heating mode, the first side outlet valve assembly 128 may be configured to fluidly disconnect the heat pump connection 128a from the hot conduit connection 128b. Upon the reversible heat pump assembly 100 is set in the cooling mode, the first side outlet valve assembly 128 is configured to fluidly connect the heat pump connection 128a and the hot conduit connection 128b. Upon the reversible heat pump assembly 100 is set in the cooling mode, the first side outlet valve assembly 128 may be configured to fluidly disconnect the heat pump connection 128a from cold conduit connection 128c.

The heat pump assembly 100 may further comprise a second side inlet valve assembly 138. The second side inlet valve assembly 138 comprises a heat pump connection 138a connected to the second side inlet 132, a heating circuit connection 138b arranged to be connected to the heating circuit 140 and a cooling circuit connection 138c arranged to be connected to the cooling circuit 150. All the connections 138a-c of the second side inlet valve assembly 138 are configured to fluidly connect the second side inlet valve assembly 138 to the respective device/circuit. Any such connection may be made using piping. Hence, the heat pump connection 138a is configured to fluidly connect the second side inlet valve assembly 138 with the second side inlet 132 of the heat pump 110. The heating circuit connection 138b is arranged to fluidly connect the second side inlet valve assembly 138 with the heating circuit 140. The cooling circuit connection 138c is arranged to fluidly connect the second side inlet valve assembly 138 and the cooling circuit 150. Upon the reversible heat pump assembly 100 is set in the heating mode, the second side inlet valve assembly 138 is configured to fluidly connect the heat pump connection 138a with the heating circuit connection 138b. Upon the reversible heat pump assembly 100 is set in the heating mode, the second side inlet valve assembly 138 may be configured to fluidly disconnect the heat pump connection 138a from the cooling circuit connection 136c. Upon the reversible heat pump assembly 100 is set in the cooling mode, the second side inlet valve assembly 138 is configured to fluidly connect the heat pump connection 138a and the cooling circuit connection 138c. Upon the reversible heat pump assembly 100 is set in the cooling mode, the second side inlet valve assembly 138 may be configured to fluidly disconnect the heat pump connection 138a from the heating circuit connection 138b.

The heat pump assembly 100 may further comprise a heat pump assembly mode controller 108a. The heat pump assembly mode controller 108a is configured to selectively set the heat pump assembly 100 in the heating mode or in the cooling mode. This may e.g. be made by the heat pump assembly mode controller 108a being configured to control the heat pump 110, the first side inlet valve assembly 126 and/or the second side outlet valve assembly 136. The heat pump assembly mode controller 108a may further be configured to control the first side outlet valve assembly 128. The heat pump assembly mode controller 108*a* may further be configured to control the second side inlet valve assembly 138. The heat pump assembly mode controller 108*a* is typically software implemented. However, the heat pump assembly mode controller 108*a* may be a combined hardware and software implementation. The software portions of the heat pump assembly mode controller 108*a* may be run on a processing unit. The heat pump assembly mode controller 108*a* is configured to send control signal to the assembly portions of the heat pump assembly 100 to be controlled by the heat pump assembly mode controller 108*a*.

The heat pump assembly mode controller 108*a* is configured to set the heat pump assembly 100 in either the heating mode or in the cooling mode based on a heating demand from one or more local heating circuits 140 connected to the heat pump assembly 100 and a cooling demand from one or more local cooling circuits 150 connected to the heat pump assembly 100. The heating demand may comprise time resolved information pertaining to amount of heating desired by the one or more local heating circuits 140. The cooling demand may comprise time resolved information pertaining to amount of cooling desired by the one or more local cooling circuits 150.

The time resolved information pertaining to amount of heating/cooling may be predicted heating and/or cooling demands. The prediction may be based on environmental factors, such as e.g. weather condition and phenomena, and/or on behaviour of consumers. Prediction due to environmental factors may be based on weather forecast data, e.g. predicted temperature storms, blizzards, or heat waves. The prediction may be based on pre-recorded time resolved data pertaining to historical heating/cooling outtake by the one or more heating/cooling circuits 140, 150. The prediction may also be based on the type of day. Hence, working days, holidays, or irregular phenomena with similarities in the need for heating/cooling may hence be considered. The prediction may also be based on time of day. Hence, for example a morning peak demand for hot tap water used for showering may be considered. The prediction may be based on data pertaining to a type of building wherein the heat pump assembly 100 is located. The type of building may be one of; residential building, commercial building, freestanding house, or apartment building. Different types of buildings may react differently to each of the above mentioned phenomena. Thus, if it is known beforehand that e.g. blizzards affect free-standing houses more than apartment complexes.

Figure 3:
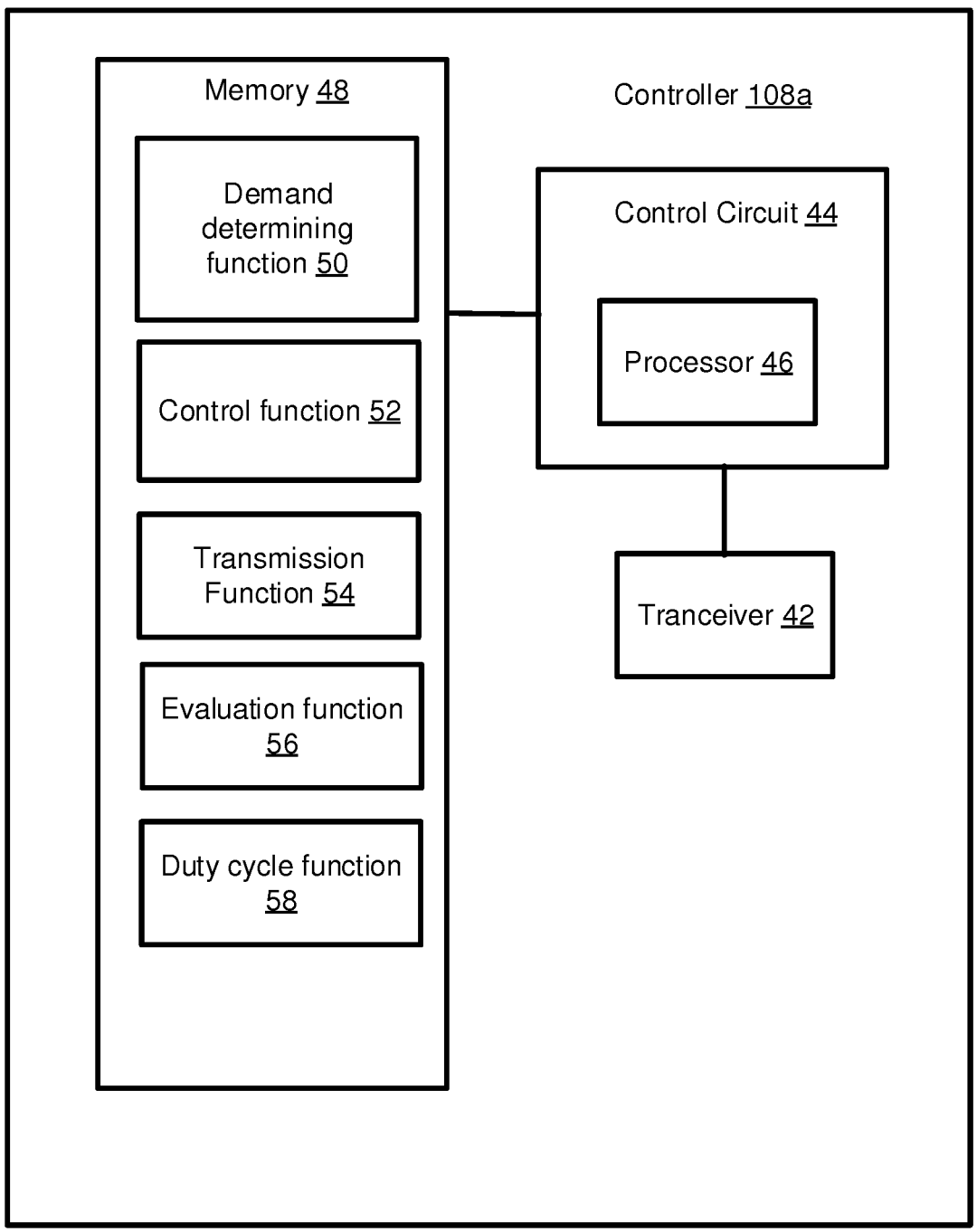
FIG. 3 is a schematic of a controller for controlling the reversible heat pump assembly of FIG. 2.

A more detailed schematic of the heat pump assembly mode controller 108*a* is shown in connection with FIG. 3. The heat pump assembly mode controller 108*a* comprises a transceiver 42, a control circuit 44 and a memory 48.

The transceiver 42 is configured to communicate with the one or more heating circuits 140 and the one or more cooling circuits 150, or at least controllers of the one or more heating circuits 140 and the one or more cooling circuits 150. The transceiver 42 is further configured to communicate with the heat pump 110, the first side inlet valve assembly 126 and/or the second side outlet valve assembly 136. The transceiver 42 may further be configured to communicate with the first side outlet valve assembly 128 and the second side inlet valve assembly 138. The communications may include data transfers, and the like. Data transfers may include, but are not limited to, downloading and/or uploading data and receiving or sending messages. The data may be processed by the heat pump assembly mode controller 108*a*. The processing may include storing the data in a memory, e.g. the memory 48 of the heat pump assembly mode controller 108*a*, executing operations or function, and so forth.

The control circuit 44 is configured to carry out overall control of functions and operations of the heat pump assembly mode controller 108*a*. The control circuit 44 may include a processor 46, such as a central processing unit (CPU), microcontroller, or microprocessor. The processor 46 is configured to execute program code stored in the memory 48, in order to carry out functions and operations of the heat pump assembly mode controller 108*a*.

The memory 48 may be one or more of a buffer, a flash memory, a hard drive, a removable media, a volatile memory, a non-volatile memory, a random access memory (RAM), or another suitable device. In a typical arrangement, the memory 48 may include a non-volatile memory for long term data storage and a volatile memory that functions as system memory for the control circuit 48. The memory 48 may exchange data with the control circuit 44 over a data bus. Accompanying control lines and an address bus between the memory 48 and the control circuit 44 also may be present.

Functions and operations of the heat pump assembly mode controller 108*a* may be embodied in the form of executable logic routines (e.g., lines of code, software programs, etc.) that are stored on a non-transitory computer readable medium (e.g., the memory 48) of the heat pump assembly mode controller 108*a* and are executed by the control circuit 44 (e.g., using the processor 46). Furthermore, the functions and operations of the heat pump assembly mode controller 108*a* may be a stand-alone software application or form a part of a software application that carries out additional tasks related to the heat pump assembly mode controller 108*a*. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

The control circuit 44 is configured to execute a demand determining function 50. The demand determining function 50 is configured to, for a time period, determine a heating demand for heat from one or more local heating circuits 140 connected to the reversible heat pump assembly 100 and a cooling demand for cold from one or more local cooling circuits 140 connected to the reversible heat pump assembly 100. The time period may be a future time-period. This since the heating demand and the cooling demand is time resolved predicted information pertaining to amount of heating/cooling that will be needed by the one or more heating circuits 140 and the one or more cooling circuits 150.

The control circuit 44 is further configured to execute a control function 52. The control function 52 is configured to generate a control signal indicative of if the reversible heat pump assembly 100 is to be set in either the heating mode or in the cooling mode. The control function 52 is configured to use the heating demand and the cooling demand as input data.

The control circuit 44 is further configured to execute a transmission function 54. The transmission function 54 is configured to send the control signal to the heat pump 110. The transmission function 54 may further be configured to send the control signal to one or more of the first side inlet valve assembly 126, the second side outlet valve assembly 136, the first side outlet valve assembly 128, and the second side inlet valve assembly 138. The transmission function 54 may be configured to send the control signal using the transceiver 42.

Heating and cooling demands for a specific heat pump assembly 100 may overlap. However, the heat pump assembly 100 may, at a specific point in time, only be set in one of the heating mode or the cooling mode. Hence, the heat pump assembly mode controller 108a is configured to control the setting of the reversible heat pump assembly 100 in either the heating mode or the cooling mode based on the heating demand and the cooling demand. Hence, the control circuit 44 may further be configured to execute an evaluation function 56. The evaluation function 56 is configured to identify simultaneous desires of setting the reversible heat pump assembly 100 in both the heating mode and the cooling mode. The evaluation function 56 is configured to use the heating demand and the cooling demand as input data. The control function 52 may then further be configured to use the identified simultaneous desires of setting the reversible heat pump assembly 100 in both the heating mode and the cooling mode when generating the control signal. The control function 52 may be configured to delay an execution of setting the reversible heat pump assembly 100 in the heating mode if the reversible heat pump assembly 100 is already in the cooling mode or vice versa. The control function 52 may be configured to alter the setting of the reversible heat pump assembly 100 in the heating mode and in the cooling mode so that a simultaneous demand may be handled by, in an interspersed manner, setting the reversible heat pump assembly 100 in the heating mode and in the cooling mode.

The control function 52 may further be configured to run the reversible heat pump assembly 100 in either the heating mode or in the cooling mode for a running time of at least a predetermined number times a mode change-over time. The mode change-over time is the time it takes for the reversible heat pump assembly 100 to change from the heating mode to the cooling mode or vice versa. Typical change-over times are in the order of minutes, e.g. 1-5 minutes. The predetermined number may be set to be in the range of 5-10. By this the time spent on changing the mode of the reversible heat pump assembly 100 may be limited. Hence, the degree of utilization of the reversible heat pump assembly 100 may be increased.

The control function 52 may further be configured to, in response to identified simultaneous desires, temporarily setting heat pump 110 to deliver heat at an output greater than an output indicated by the heating demand. By this the time the reversible heat pump assembly 100 will need to be in the heating mode may be reduced and the possibility for the reversible heat pump assembly 100 to meet all the heating and cooling demands may be increased.

The control function 52 may further be configured to, in response to identified simultaneous desires, temporarily setting the heat pump 110 to deliver cold at an output greater than an output indicated by the cooling demand. By this the time the reversible heat pump assembly 100 will need to be in the cooling mode may be reduced and the possibility for the reversible heat pump assembly 100 to meet all the heating and cooling demands may be increased.

The control function 52 may be configured to, in response to identified simultaneous desires, identify the desire indicating the in time longest need among a heating and cooling desire. This information may be used for determining if the outtake of heat or the outtake of cold shall be increased. The control function 52 may be configured to increase the outtake of heat if the desire for heat indicates the in time longest need. The control function 52 may be configured to increase the outtake of cold if the desire for cold indicates the in time longest need.

The control function 52 may further be configured to, determine how close to a maximum outtake of heat or cold the heat pump needs to be set due to the heating desire and cooling desire, respectively. The control function 52 may further be configured to, temporarily increase the outtake of heat or cold based on the closeness to a maximum outtake of heat or cold the heat pump needs to be set. For example, the outtake that is has the largest gap to the maximum outtake may be increased the most. Some outtakes of heat or cold may be increased but other may not. For example, comfort heating may be increased (at least for a while) in order to preheat a building. However, some outtakes may not be increased. For example, comfort cooling may not be increased, increasing outtake of comfort cooling with just one or a few ° C. will immediately be considered unpleasant for people in that building. Hence, different type of heat and cold outtake may be prioritized differently. This will be discussed in more detail in a section further below in this description.

For some set-ups of a reversible heat pump assembly 100 the outtake of heat or cold may even be decreased and at the same time increase the time during which the outtake is made. This may for example be in situations when the desire for heat or cold is indicating an in time short desire for heat or cold. With short is in this context meant below the change-over time for the reversible heat pump assembly 100. Increasing the time the heat pump 110 will be in a specific mode may increase the lifetime of the heat pump 110.

The control circuit 44 may further be configured to execute a duty cycle function 58. The duty cycle function 58 is configured to, for the time period, determine a heating duty cycle for the heating mode. The duty cycle function 58 is configured to use the heating demand for determining the heating duty cycle. The duty cycle function 58 is configured to, for the time period, determine a cooling duty cycle for the cooling mode. The duty cycle function 58 is configured to use the cooling demand as input data for determining the cooling duty cycle. The duty cycle function 58 may be configured to determine a total duty cycle for the reversible heat pump assembly 100. The total duty cycle is a sum of the heating duty cycle and the cooling duty cycle.

The control function 52 may further be configured to, in response to the total duty cycle being below a first threshold, delay, in time, the setting of the reversible heat pump assembly 100 in the cooling mode, in case of the control signal is already indicative of the reversible heat pump assembly 100 is to be set in the heating mode. The first threshold may be 80% or lower. The control function 52 may further be configured to, in response to the total duty cycle being below the first threshold, delay, in time, the setting of the reversible heat pump assembly 100 in the heating mode, in case of the control signal is already indicative of the reversible heat pump assembly 100 is to be set in the cooling mode.

The control function 52 may further be configured to, in response to the total duty cycle being above a second threshold, generate the control signal to comprise information to temporarily set the heat pump 110 to deliver heat at an output greater than an output being indicated by the heating demand. By this the heating duty cycle will be reduced and the possibility for the reversible heat pump assembly 100 to meet all the heating and cooling demands may be increased. The second threshold may be 80% or higher. The control function 52 may further be configured to, in response to the total duty cycle being above the second threshold, generate the control signal to comprise information to temporarily set the heat pump 110 to deliver cold at an output greater than an output being indicated by the cooling demand. By this the cooling duty cycle will be reduced and the possibility for the reversible heat pump assembly 100 to meet all the heating and cooling demands may be increased.

Each heating system of a building 5 comprises one or more heating circuits 140 connected to the heat pump assembly 100. Each cooling system of a building 5 comprises one or more cooling circuits 150 connected to the heat pump assembly 100. Examples of heating systems are a hot water production system (e.g. a domestic hot water production system), a comfort heating system, and a process heating system. Examples of cooling systems are a comfort cooling system and a process cooling system. The heat pump assembly mode controller 108a may be configured to prioritize the demands from the heating and cooling systems differently. For example, the heat pump assembly mode controller 108a may be configured to prioritize the cooling system higher than the heating system. This since cooling may be of higher importance than heating. However, the heat pump assembly mode controller 108a may be configured to prioritize the heating system higher than the cooling system. Further, the heat pump assembly mode controller 108a may be configured to prioritize different heating circuits 140 of a plurality of heating circuits differently. For example, a hot water production circuit may be prioritized higher than a comfort heating system. The heat pump assembly mode controller 108a may be configured to set which one of a plurality of heating circuits 140 to be provided with heating from the heat pump assembly 100. This setting may be based on the prioritizing of the different heating circuits 140. Further, the heat pump assembly mode controller 108a may be configured to prioritize different cooling circuits 150 of a plurality of cooling circuits differently. The heat pump assembly mode controller 108a may be configured to set which one of a plurality of cooling circuits 150 to be provided with cooling from the heat pump assembly 100. This setting may be based on the prioritizing of the different cooling circuits 150. According to a specific example, tap hot water production may have the highest priority, process cooling may have the second highest priority, comfort cooling may have the second lowest priority and comfort heating may have the lowest priority. According to another specific example, tap hot water production may have the highest priority, process cooling may have the second highest priority, comfort heating may have the second lowest highest priority and comfort cooling may have the lowest priority. According to other examples, process cooling may have higher priority that hot tap water production.

The control function 52 may further be configured to generate the control signal to comprise information pertaining to one or more of the following. Upon the control signal comprises information pertaining to setting the reversible heat pump assembly 100 in the heating mode, setting the reversing valve 116 of the heat pump 110 such that refrigerant of the heat pump 110 is flowing from the first side coil 112 to the second side coil 114. Upon the control signal comprises information pertaining to setting the reversible heat pump assembly 100 in the cooling mode, setting the reversing valve 116 of the heat pump 110 such that refrigerant of the heat pump 110 is flowing from the second side coil 114 to the first coil 112.

The transmission function 54 may further be configured to send the control signal to one or more of the first side inlet valve assembly 126 of the reversible heat pump assembly 100, the second side outlet valve assembly 136 of the reversible heat pump assembly 100. The control function 52 may further be configured to generate the control signal to comprise information pertaining to: upon the control signal comprises information pertaining to setting the reversible heat pump assembly 100 in the heating mode, setting the first side inlet valve assembly 126 to fluidly connect the hot conduit connection 126b and the heat pump connection 126a and to fluidly disconnect the cold conduit connection 126c from the heat pump connection 126a; and upon the control signal comprises information pertaining to setting the reversible heat pump assembly 100 in the cooling mode, setting the second side outlet valve assembly 136 to fluidly connect the heat pump connection 136a and the heating circuit connection 136b and to fluidly disconnect the heat pump connection 136a from the cooling circuit connection 136c.

Figure 4:
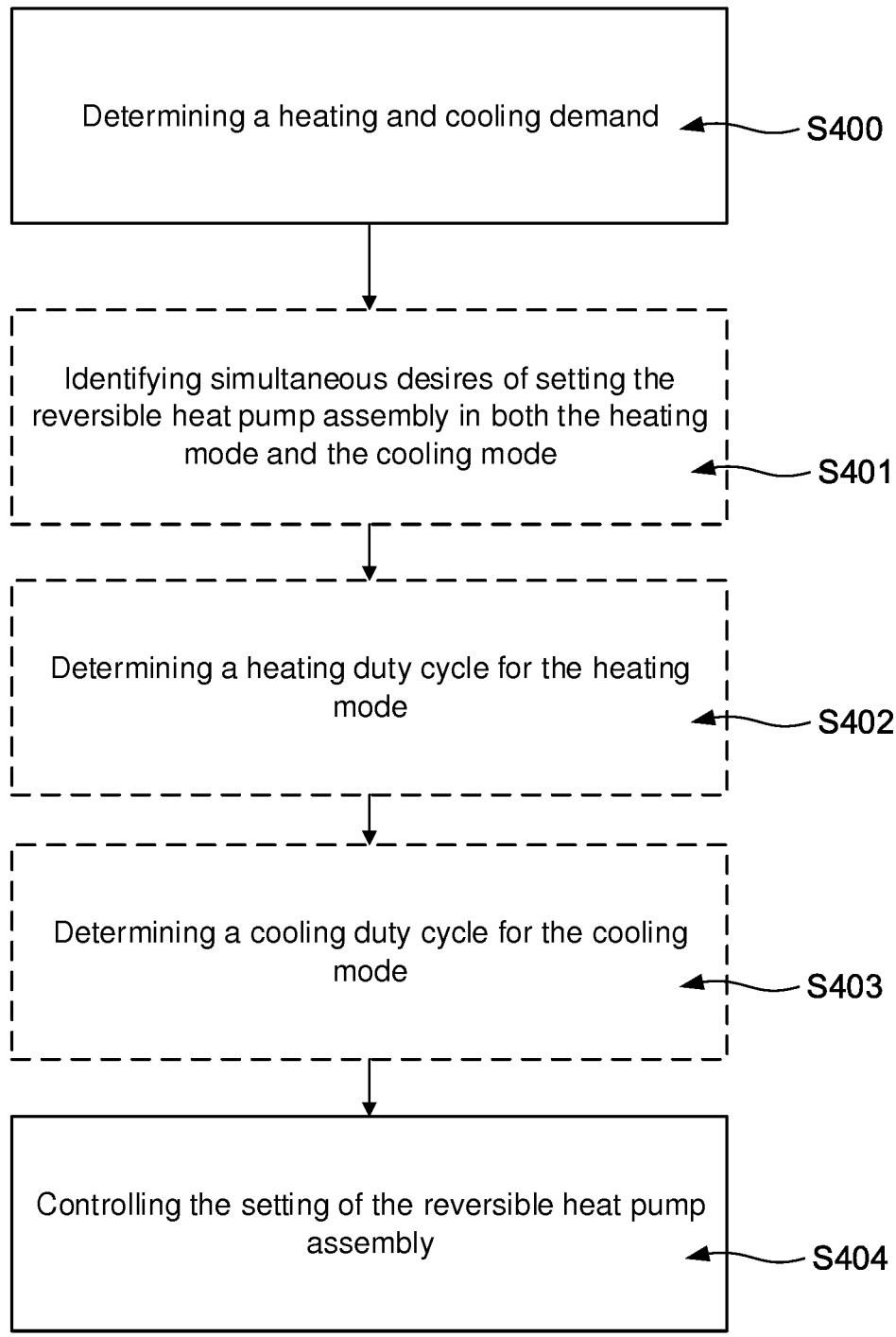
FIG. 4 is a block diagram of a method for controlling the reversible heat pump assembly of FIG. 2.

With reference to FIG. 4 a method for controlling the reversible heat pump assembly 100 will be discussed. The method comprises: for a time period, determining S400 a heating demand from the one or more local heating circuits 140 and a cooling demand from the one or more local cooling circuits 150. Controlling S404, based on the heating demand and the cooling demand, the setting of the reversible heat pump assembly 100 in either the heating mode or the cooling mode. The heating demand may comprise time resolved information pertaining to amount of heating desired by the one or more local heating circuits 140. The cooling demand may comprise time resolved information pertaining to amount of cooling desired by the one or more local cooling circuits 150.

The method may further comprise identifying S401, based on the heating demand and the cooling demand, simultaneous desires of setting the reversible heat pump assembly 100 in both the heating mode and the cooling mode. The act of controlling S404 may further be based on the identified simultaneous desires.

The act of controlling S404 may comprises running the reversible heat pump assembly 100 in either the heating mode or in the cooling mode for a running time of at least a predetermined number times the mode change-over time.

The method may further comprise determining S402, for the time period and based on the heating demand, a heating duty cycle for the heating mode. The method may further comprise determining S403, for the time period and based on the cooling demand, a cooling duty cycle for the cooling mode. The act of controlling S404 may comprise, in response to the heating duty cycle together with the cooling duty cycle being below the first threshold, delaying, in time, the setting of the reversible heat pump assembly 100 in the cooling mode, in case of the reversible heat pump assembly 100 is already in the heating mode. The act of controlling S404 may comprise delaying, in time, the setting of the reversible heat pump assembly 100 in the heating mode, in case of the reversible heat pump assembly 100 is already in the cooling mode.

The act of controlling S404 may comprise, in response to the heating duty cycle together with the cooling duty cycle being above the second threshold, temporarily setting the heat pump 110 to deliver heat at an output greater than an output being indicated by the heating demand, thereby reducing the heating duty cycle.

The act of controlling S404 may comprise, in response to the heating duty cycle together with the cooling duty cycle being above the second threshold, temporarily setting the heat pump 110 to deliver cold at an output greater than an output being indicated by the cooling demand, thereby reducing the cooling duty cycle.

The method may further comprise in response to identified simultaneous desires, temporarily setting the heat pump 110 to deliver heat at an output greater than an output indicated by the heating demand, thereby reducing the heating duty cycle.

The method may further comprise in response to identified simultaneous desires, temporarily setting the heat pump 110 to deliver cold at an output greater than an output indicated by the cooling demand, thereby reducing the cooling duty cycle.

The method may further comprise associating a heating priority level to the heating demand and a cooling priority level to the cooling demand, wherein the act of controlling S404 is further based on the heating and cooling priority levels. The act of associating a heating priority level to the heating demand may comprise associating a specific heating priority level to a specific heating demand. The act of associating a cooling priority level to the cooling demand may comprise associating a specific cooling priority level to a specific cooling demand.

With reference to FIG. 2, the heat pump assembly 100 may further comprise a pressure difference determining device 106. The pressure difference determining device 106 is configured to determine a local pressure difference, $\Delta p$, between heat transfer liquid of the hot and the cold conduits 12; 14 of the thermal energy circuit 10. $\Delta p$ is preferably measured in the vicinity to where the heat pump assembly 100 is connected to the thermal energy circuit 10. The pressure difference determining device 106 may comprises a hot conduit pressure determining device 106a and a cold conduit pressure determining device 106b. The hot conduit pressure determining device 106a is arranged to be connected to the hot conduit 12 for measuring a local pressure, $p_{1h}$, of heat transfer liquid of the hot conduit 12. The cold conduit pressure determining device 106b is arranged to be connected to the cold conduit 14 for measuring a local pressure, plc, of heat transfer liquid of the cold conduit 14. The pressure difference determining device 106 is configured to determine $\Delta p$ as a pressure difference between the local pressure of heat transfer liquid of the hot conduit 12 and the local pressure of heat transfer liquid of the cold conduit 14.

The pressure difference determining device 106 may be implemented as a hardware device, a software device, or as a combination thereof. The consumer assembly pressure difference determining device 106 is arranged to generate a local pressure difference signal indicative of the consumer assembly local pressure difference, $\Delta p$. The pressure difference determining device 106 may be configured to send the local pressure difference signal to a flow mode controller 108b. The flow mode controller 108b is typically software implemented. However, the flow mode controller 108b may be a combined hardware and software implementation. The software portions of the flow mode controller 108b may be run on a processing unit. The flow mode controller 108b and the heat pump assembly mode controller 108a may be implemented as a single device.

The heat pump assembly 100 may further comprise a flow controller 101. The flow controller 101 is configured to control the flow of heat transfer fluid from the thermal energy grid 10 to the heat pump 110. Hence, the flow controller 101 is connected in between the thermal energy grid 10 and the heat pump 110. The flow controller 101 may be connected in between the first side inlet valve assembly 126 and the first side inlet 122. This is preferred since only one flow controller 101 is needed. Hence, the heat pump 110 is connected to the thermal energy grid 10 via the flow controller 101. The flow controller 101 is selectively set in a pumping mode or in a flowing mode. The flow controller 101 is selectively set in the pumping mode or in the flowing mode based on a heat pump assembly local delivery differential pressure, $\Delta p_{dp}$, according to the following:

$$\Delta p_{dp} = \Delta p + \Delta p_{che}$$

wherein $\Delta p_{che}$ is a differential pressure for overcoming the pressure drop over the heat pump 110 and possible also the first side inlet valve assembly 126 and/or the first side outlet valve assembly 128. This will be discussed in more detail below. The flow mode controller 108b may be configured to set the flow controller 101 in the pumping mode or in a flowing mode. Embodiments of a flow controller 101 may e.g. be found in PCT/EP2017/083077 by the same applicant.

Upon set in the pumping mode the flow controller 101 is configured to act as a pump 104 for pumping heat transfer liquid from the thermal energy grid 10 into the heat pump 110. Hence, upon the flow controller 101 being set in the pumping mode, heat transfer liquid from the thermal energy grid 10 is pumped into the heat pump 110. Upon set in flowing mode the flow controller 101 is configured to act as a flow regulator 102 for allowing heat transfer liquid from the thermal energy grid 10 to flow into the heat pump 110. The flow regulator 102 may be seen as a valve. Hence, upon the flow controller 101 being set in the flowing mode, heat transfer liquid from the thermal energy grid 10 is allowed to flow into the heat pump 110. Again, the choice of allowing heat transfer liquid from the thermal energy grid 10 to flow into the heat pump 110 or pumping heat transfer liquid from the thermal energy grid 10 into the heat pump 110, is made based on the heat pump assembly local delivery differential pressure, Apo.

The flow mode controller 108b is configured to selectively set the flow controller 101 in the pumping mode or in the flowing mode. In the pumping mode the flow controller 101 is acting as a pump 104. In the flowing mode the flow controller 101 is acting as a flow regulator 102. Hence, the flow controller 101 is configured to selectively act as a pump 104 or as a flow regulator 102. The flow controller 101 is configured to, upon acting as a pump 104, pump heat transfer liquid through the flow controller 101. The flow controller 101 is configured to, upon acting as a flow regulator 102, allow heat transfer liquid to flow through the flow controller 101.

In the thermal energy circuit 10 a differential pressure between heat transfer liquid in hot and cold conduits 12, 14 may change over time. More precisely, the differential pressure between heat transfer liquid of the hot and cold conduits 12, 14 may change such that the differential pressure changes from positive to negative or vice versa. Depending on the variating differential pressure between the hot and cold conduits 12, 14 of the thermal energy circuit 10 and depending on if the reversible heat pump assembly 100 is set in the heating mode or in the cooling mode sometimes heat transfer liquid of the thermal energy circuit 10 need to be pumped through the reversible heat pump assembly 100 and sometimes heat transfer liquid of the thermal energy circuit 10 need to be allowed to flow through the reversible heat pump assembly 100. Some examples are given directly below.

Assume that the reversible heat pump assembly 100 is set in the heating mode. Hence, heat transfer liquid of the thermal energy circuit 10 is set to be transferred from the hot conduit 12 via the first side 120 of the heat pump 110 to the cold conduit 14. In case the heat pump assembly local delivery differential pressure, Apo, is indicative of that there is a higher local pressure in the hot conduit 12 than in the cold conduit 14 the flow controller 101 shall be set to allow a flow of heat transfer liquid to flow through the flow controller 101. Hence, the flow mode controller 108b is configured to set the flow controller 101 in the flowing mode. In case the heat pump assembly local delivery differential pressure, Apo, is indicative of that there is a lower local pressure in the hot conduit 12 than in the cold conduit 14 the flow controller 101 shall be set to pump a flow of heat transfer liquid from the hot conduit 12 to the cold conduit 14. Hence, the flow mode controller 108b is configured to set the flow controller 101 in the pumping mode.

Assume that the reversible heat pump assembly 100 is set in the cooling mode. Hence, heat transfer liquid of the thermal energy circuit 10 is set to be transferred from the cold conduit 14 via the first side 120 of the heat pump 110 to the hot conduit 16. In case the heat pump assembly local delivery differential pressure, Apo, is indicative of that there is a higher local pressure in the cold conduit 14 than in the hot conduit 12 the flow controller 101 shall be configured to allow a flow of heat transfer liquid to flow through the flow controller 101. Hence, the flow mode controller 108b is configured to set the flow controller 101 in the flowing mode. In case the heat pump assembly local delivery differential pressure, Apo, is indicative of that there is a lower local pressure in the cold conduit 14 than in the hot conduit 12 the flow controller 101 shall be configured to pump a flow of heat transfer liquid from the cold conduit 14 to the hot conduit 12. Hence, the flow mode controller 108b is configured to set the flow controller 101 in the pumping mode.

The flow mode controller 108b may also be configured to control the flow rate of heat transfer liquid through the flow controller 101. Accordingly, the flow mode controller 108b may also be configured to control the pump 104 of the flow controller 101 such that the flow rate of heat transfer liquid pumped by the pump 104 is controlled. Moreover, the flow mode controller 108b may also be configured to control the flow regulator 102 such that the flow rate of heat transfer liquid flowing through the flow controller 101 is controlled.

The reversible heat pump assembly 100 may further comprise a hot conduit temperature determining device 105a and a cold conduit temperature determining device 105b. The hot conduit temperature determining device 105a is arranged to be connected to the hot conduit 12 for measuring a local temperature, $t_h$, of heat transfer liquid of the hot conduit 12. The cold conduit temperature determining device 105b is arranged to be connected to the cold conduit 14 for measuring a local temperature, $t_c$, of the heat transfer liquid of the cold conduit 14. The hot conduit temperature determining device 105a and the cold conduit temperature determining device 105b may connected to the flow mode controller 108b for communicating $t_h$ and $t_c$ thereto.

The reversible heat pump assembly 100 may further comprise an outlet temperature determining device 105c. The outlet temperature determining device 105c is arranged to be connected to a return conduit connecting the first side outlet 124 of the heat pump 110 and the first side outlet valve assembly 128. The outlet temperature determining device 105c is arranged to measure an outlet temperature, $t_{return}$, of heat transfer liquid exiting the first side outlet 124 of the heat pump 110 and being returned to the thermal energy circuit 10. The outlet temperature determining device 105c may be connected to the flow mode controller 108b for communicating $t_{return}$ thereto.

The different temperatures $t_h$, $t_c$ and $t_{return}$ may be used for controlling the flow rate of heat transfer liquid of the thermal energy circuit 10 through heat pump 110. Upon the reversible heat pump assembly 100 is set in the heating mode the flow rate is preferably controlled such that the $t_{return}=t_c$. Upon the reversible heat pump assembly 100 is set in the cooling mode the flow rate is preferably controlled such that the $t_{return}=t_h$. Alternatively, or in combination, and independent upon if the reversible heat pump assembly 100 is set in the heating mode or in the cooling mode, the flow rate of heat transfer liquid of the thermal energy circuit 10 through heat pump 110 may be controlled such that the heat pump 110 inhale or exhale heat at a defined temperature difference. A temperature difference of 5-15° C., preferably 8-10° C., corresponds to optimal flows through the heat pump 110. The flow rate of heat transfer liquid of the thermal energy circuit 10 through heat pump 110 may be controlled by the flow mode controller 108b by controlling the flow rate through the flow controller 101.

Hence, a reversible heat pump assembly 100 is disclosed. The heat pump assembly 100 comprises a heat pump 110 having a first side 120 and a second side 130. The heat pump 110 is configured to transfer heat from the first side 120 to the second side 130 or vice versa. The heat pump assembly 100 further comprises a first side inlet valve assembly 126 having a heat pump connection 126a connected to the first side 120, and hot and cold conduit connections 126b; 126c arranged to be connected to the thermal energy grid 10 comprising hot and cold conduits 12; 14. The heat pump assembly 100 further comprise a second side outlet valve assembly 136 having a heat pump connection 136a connected to the second side 130, and heating and cooling circuit connections 136b; 136c arranged to be connected to heating and cooling circuits 130; 140, respectively. The reversible heat pump assembly 100 is configured to be selectively set in either a heating mode or a cooling mode. In the heating mode the heat pump 110 is configured to transfer heat from the first side 120 to the second side 130. In the heating mode the first side inlet valve assembly 126 is configured to fluidly connect the hot conduit connection 126b and the heat pump connection 126a. In the heating mode the second side outlet valve assembly 136 is configured to fluidly connect the heat pump connection 136a and the heating circuit connection 136b. In the cooling mode the heat pump 110 is configured to transfer heat from the second side 130 to the first side 120. In the cooling mode the first side inlet valve assembly 126 is configured to fluidly connect the cold conduit connection 126c and the heat pump connection 126a. In the cooling mode the second side outlet valve assembly 136 is configured to fluidly connect the heat pump connection 136a and the cooling circuit connection 136c.

Moreover, a district thermal energy distribution system 1, comprising the hot and the cold conduits 12, 14 is provided. The district thermal energy distribution system 1 also comprises one or more reversible heat pump assemblies 100. Accordingly, the district thermal energy distribution system 1 comprises a thermal energy circuit 10 comprising the hot and cold conduit 12, 14 for allowing flow of heat transfer liquid therethrough. The district thermal energy distribution system 1 further comprises one or more reversible heat pump assemblies 100. In accordance with what has been disclosed above the one or more reversible heat pump assemblies 100 may be connected to the thermal energy circuit 10 via a flow controller 101. The flow controller 101 is selectively set in pumping mode or a flowing mode based on the local pressure difference between heat transfer liquid of the hot and cold conduits 12, 14. Alternatively or in addition, the district thermal energy distribution system 1 may comprise one or more reversible heat pump assemblies 100 selectively connected to the thermal energy circuit 10 via a valve (e.g. a flow regulator) and a pump. Hence, instead of using a flow controller 101 according to the above a reversible heat pump assembly 100 may be connected to the thermal energy circuit 10 via a valve and via a pump. Depending on the mode of the reversible heat pump assembly 100 and on the local pressure difference between the hot and cold conduits 12; 14 of the thermal energy circuit 10 at the connection between the reversible heat pump assembly 100 and thermal energy circuit 10 either the valve or the pump is used for letting heat transfer liquid of the thermal energy circuit 10 to flow through the first side 120 of the heat pump 110 of the reversible heat pump assembly 100.

Preferably, the demand to inhale or exhale heat using the reversible heat pump assembly 100 is made at a defined temperature difference. A temperature difference of 5-15° C., preferably 8-10° C., corresponds to optimal flows through the heat pump 110.

The local pressure difference between the hot and cold conduits 12, 14 may vary along the thermal energy circuit 10. Especially, the local pressure difference between the hot and cold conduits 12, 14 may vary from positive to negative pressure difference seen from one of the hot and cold conduits 12, 14. Hence, sometimes a specific reversible heat pump assembly 100 may need to pump heat transfer liquid of the thermal energy circuit 10 through the corresponding heat pump 110 and sometimes the reversible heat pump assembly 100 may need to let heat transfer liquid of the thermal energy circuit 10 to flow through the corresponding heat pump 110. Accordingly, it will be possible to let all the pumping within the district thermal energy distribution system 1 to take place in the reversible heat pump assemblies 100. Hence, an easy to build district thermal energy distribution system 1 is provided. Further a district thermal energy distribution system 1 that is easy to control is provided. Moreover, due to the limited flows and pressures needed the pump assemblies of the flow controllers 101 may be based on frequency controlled circulation pumps.

The person skilled in the art realizes that the present invention by no means is limited to the preferred embodiments described above. On the contrary, many modifications and variations are possible within the scope of the appended claims.

For example, in the above discussed embodiments the flow mode controller 108*b* and the heat pump assembly mode controller 108*a* are discussed as being implemented as a single device. However, the functions of the two different mode controllers 108*a*, 108*b* may be distributed on different physical devices. For example, one device (acting as the heat pump assembly mode controller 108*a*) may be configured to control the setting of the reversible heat pump assembly 100 in either the heating mode or the cooling mode, another device (acting as the flow mode controller 108*b*) may be configured to control if the flow controller 101 shall be set in the flowing mode or in the pumping mode. These two different devices may be configured to communicate with each other.

Additionally, variations to the disclosed embodiments can be understood and effected by the skilled person in practicing the claimed invention, from a study of the drawings, the disclosure, and the appended claims.

The invention claimed is:

1. A controller configured to selectively set a reversible heat pump assembly in either a heating mode or in a cooling mode, the controller comprising a control circuit configured to:
   for a time period, determine, using a demand determining function, a heating demand for heat to be delivered by the reversible heat pump assembly and a cooling demand for cold to be delivered by the reversible heat pump assembly;
   identify, using an evaluation function, simultaneous heating and cooling demands, wherein the evaluation function is configured to use the heating demand and the cooling demand as input data;
   generate, using a control function, a control signal indicative of whether the reversible heat pump assembly is to be set in either the heating mode or in the cooling mode, wherein the control function is configured to use the heating demand, the cooling demand and the identified simultaneous heating and cooling demands as input data, wherein the control signal is generated such that, in response to identified simultaneous heating and cooling demands, temporarily setting a heat pump of the reversible heat pump assembly to deliver heat at an output greater than an output indicated by the heating demand, thereby reducing a heating duty cycle and/or temporarily setting the heat pump to deliver cold at an output greater than an output indicated by the cooling demand, thereby reducing a cooling duty cycle; and
   send, using a transmission function, the control signal to the heat pump of the reversible heat pump assembly.

2. A controller configured to selectively set a reversible heat pump assembly in either a heating mode or in a cooling mode, the controller comprising a control circuit configured to:
   for a time period, determine, using a demand determining function, a heating demand for heat to be delivered by the reversible heat pump assembly and a cooling demand for cold to be delivered by the reversible heat pump assembly;
   generate, using a control function, a control signal indicative of whether the reversible heat pump assembly is to be set in either the heating mode or in the cooling mode, wherein the control function is configured to use the heating demand and the cooling demand as input data;
   for the time period, determine, using a duty cycle function, a heating duty cycle for the heating mode and a cooling duty cycle for the cooling mode, wherein the duty cycle function is configured to use the heating demand and the cooling demand as input data;
   wherein the control function is further configured to, in response to a combination of the heating duty cycle and the cooling duty cycle being below a threshold, delay, in time, the setting of the reversible heat pump assembly in the cooling mode, in case of the control signal is already indicative of the reversible heat pump assembly is to be set in the heating mode, or delay, in time, the setting of the reversible heat pump assembly in the heating mode, in case of the control signal is already indicative of the reversible heat pump assembly is to be set in the cooling mode; and
   send, using a transmission function, the control signal to a heat pump of the reversible heat pump assembly.

3. A controller configured to selectively set a reversible heat pump assembly in either a heating mode or in a cooling mode, the controller comprising a control circuit configured to:

for a time period, determine, using a demand determining function, a heating demand for heat to be delivered by the reversible heat pump assembly and a cooling demand for cold to be delivered by the reversible heat pump assembly;

generate, using a control function, a control signal indicative of whether the reversible heat pump assembly is to be set in either the heating mode or in the cooling mode, wherein the control function is configured to use the heating demand and the cooling demand as input data;

for the time period, determine, using a duty cycle function, a heating duty cycle for the heating mode and a cooling duty cycle for the cooling mode, wherein the duty cycle function is configured to use the heating demand and the cooling demand as input data;

wherein the control function is further configured to, in response to a combination of the heating duty cycle and the cooling duty cycle being above a threshold, generate the control signal to comprise information to temporarily set the heat pump to deliver heat at an output greater than an output being indicated by the heating demand, thereby reducing the heating duty cycle and/or to comprise information to temporarily set the heat pump to deliver cold at an output greater than an output being indicated by the cooling demand, thereby reducing the cooling duty cycle; and send, using a transmission function, the control signal to a heat pump of the reversible heat pump assembly.

4. The controller according to claim 1, wherein the heating demand comprises time resolved information pertaining to amount of heating desired, wherein the cooling demand comprises time resolved information pertaining to amount of cooling desired.

5. The controller according to claim 1, wherein the heating demand is received from one or more local heating circuits connected to the reversible heat pump assembly.

6. The controller according to claim 1, wherein the cooling demand is received from one or more local cooling circuits connected to the reversible heat pump assembly.

7. The controller according to claim 1, wherein the control circuit is further configured to:

for the time period, determine, using a duty cycle function, a heating duty cycle for the heating mode and a cooling duty cycle for the cooling mode, wherein the duty cycle function is configured to use the heating demand and the cooling demand as input data;

wherein the control function is further configured to, in response to a combination of the heating duty cycle and the cooling duty cycle being below a first threshold, delay, in time, the setting of the reversible heat pump assembly in the cooling mode, in case of the control signal is already indicative of the reversible heat pump assembly is to be set in the heating mode, or delay, in time, the setting of the reversible heat pump assembly in the heating mode, in case of the control signal is already indicative of the reversible heat pump assembly is to be set in the cooling mode.

8. The controller according to claim 1, wherein the control circuit is further configured to:

for the time period, determine, using a duty cycle function, a heating duty cycle for the heating mode and a cooling duty cycle for the cooling mode, wherein the duty cycle function is configured to use the heating demand and the cooling demand as input data;

wherein the control function is further configured to, in response to a combination of the heating duty cycle and the cooling duty cycle being above a second threshold, generate the control signal to comprise information to temporarily set the heat pump to deliver heat at an output greater than an output being indicated by the heating demand, thereby reducing the heating duty cycle and/or to comprise information to temporarily set the heat pump to deliver cold at an output greater than an output being indicated by the cooling demand, thereby reducing the cooling duty cycle.

9. The controller according to claim 1, wherein the control function is further configured to generate the control signal to comprise information pertaining to:

on a condition that the control signal comprises information pertaining to setting the reversible heat pump assembly in the heating mode, setting a reversing valve of the heat pump such that refrigerant of the heat pump is flowing from a first side coil to a second side coil, and on a condition that the control signal comprises information pertaining to setting the reversible heat pump assembly in the cooling mode, setting the reversing valve of the heat pump such that refrigerant of the heat pump is flowing from the second side coil to the first coil.

10. The controller according to claim 1, wherein the transmission function is further configured to:

send the control signal to a first side inlet valve assembly of the reversible heat pump assembly, the first side inlet valve assembly comprising: a heat pump connection connected to a first side inlet of the heat pump; a hot conduit connection connected to a hot conduit of a thermal energy grid, the hot conduit being configured to allow heat transfer liquid of a first temperature to flow therethrough; and a cold conduit connection connected to a cold conduit of the thermal energy grid, the cold conduit being configured to allow heat transfer liquid of a second temperature to flow therethrough, the second temperature being lower than the first temperature; and send the control signal to a second side outlet valve assembly of the reversible heat pump assembly, the second side outlet valve assembly comprising: a heat pump connection to a second side outlet of the heat pump; a heating circuit connection connected to one or more heating circuits; and a cooling circuit connection connected to the one or more cooling circuits;

wherein the control function is further configured to generate the control signal to comprise information pertaining to:

on a condition that the control signal comprises information pertaining to setting the reversible heat pump assembly in the heating mode, setting the first side inlet valve assembly to fluidly connect the hot conduit connection and the heat pump connection and to fluidly disconnect the cold conduit connection from the heat pump connection; and on a condition that the control signal comprises information pertaining to setting the reversible heat pump assembly in the cooling mode, setting the second side outlet valve assembly to fluidly connect the heat pump connection and the heating circuit connection and to fluidly disconnect the heat pump connection from the cooling circuit connection.

11. A method for controlling a reversible heat pump assembly, the reversible heat pump assembly comprising a heat pump having a first side and a second side, the heat pump being configured to transfer heat from the first side to the second side or vice versa, wherein the reversible heat pump assembly is configured to be selectively set in either a heating mode or a cooling mode, wherein in the heating mode, the heat pump is configured to transfer heat from the first side to the second side, and wherein in the cooling mode, the heat pump is configured to transfer heat from the second side to the first side, the method comprising:

for a time period, determining a heating demand for heat to be delivered by the reversible heat pump assembly and a cooling demand for cold to be delivered by the reversible heat pump assembly, identifying, based on the heating demand and the cooling demand, simultaneous demands of setting the reversible heat pump assembly in both the heating mode and the cooling mode, and controlling, based on the heating demand, the cooling demand and the identified simultaneous heating and cooling demands, the setting of the reversible heat pump assembly in either the heating mode or the cooling mode such that in response to identified simultaneous heating and cooling demands, temporarily setting a heat pump of the reversible heat pump assembly to deliver heat at an output greater than an output indicated by the heating demand, thereby reducing a heating duty cycle and/or temporarily setting the heat pump to deliver cold at an output greater than an output indicated by the cooling demand, thereby reducing a cooling duty cycle.

12. A method for controlling a reversible heat pump assembly comprising a heat pump having a first side and a second side, the heat pump being configured to transfer heat from the first side to the second side or vice versa, wherein the reversible heat pump assembly is configured to be selectively set in either a heating mode or a cooling mode, wherein in the heating mode the heat pump is configured to transfer heat from the first side to the second side; wherein in the cooling mode the heat pump is configured to transfer heat from the second side to the first side, the method comprising:

for a time period, determining a heating demand for heat to be delivered by the reversible heat pump assembly and a cooling demand for cold to be delivered by the reversible heat pump assembly;

determining, for the time period and based on the heating demand, a heating duty cycle for the heating mode;

determining, for the time period and based on the cooling demand, a cooling duty cycle for the cooling mode; and controlling, based on the heating demand and the cooling demand, the setting of the reversible heat pump assembly in either the heating mode or the cooling mode, wherein the act of controlling comprises, in response to a combination of the heating duty cycle and the cooling duty cycle being below a threshold, delaying, in time, the setting of the reversible heat pump assembly in the cooling mode, in case of the reversible heat pump assembly is already in the heating mode, or delaying, in time, the setting of the reversible heat pump assembly in the heating mode, in case of the reversible heat pump assembly is already in the cooling mode.

13. A method for controlling a reversible heat pump assembly comprising a heat pump having a first side and a second side, the heat pump being configured to transfer heat from the first side to the second side or vice versa, wherein the reversible heat pump assembly is configured to be selectively set in either a heating mode or a cooling mode, wherein in the heating mode the heat pump is configured to transfer heat from the first side to the second side; wherein in the cooling mode the heat pump is configured to transfer heat from the second side to the first side, the method comprising:

for a time period, determining a heating demand for heat to be delivered by the reversible heat pump assembly and a cooling demand for cold to be delivered by the reversible heat pump assembly;

determining, for the time period and based on the heating demand, a heating duty cycle for the heating mode;

determining, for the time period and based on the cooling demand, a cooling duty cycle for the cooling mode; and controlling, based on the heating demand and the cooling demand, the setting of the reversible heat pump assembly in either the heating mode or the cooling mode, wherein the act of controlling comprises, in response to a combination of the heating duty cycle and the cooling duty cycle being above a threshold, temporarily setting the heat pump to deliver heat at an output greater than an output being indicated by the heating demand, thereby reducing the heating duty cycle and/or temporarily setting the heat pump to deliver cold at an output greater than an output being indicated by the cooling demand, thereby reducing the cooling duty cycle.

14. The method according to claim 11, wherein the heating demand comprises time resolved information pertaining to amount of heating desired, wherein the cooling demand comprises time resolved information pertaining to amount of cooling desired.

15. The method according to claim 11, further comprising:

receiving the heating demand from one or more local heating circuits connected to the reversible heat pump assembly.

16. The method according to claim 11, further comprising:

receiving the cooling demand from one or more local cooling circuits connected to the reversible heat pump assembly.

17. The method according to claim 12, further comprising:

identifying, based on the heating demand and the cooling demand, simultaneous demands of setting the reversible heat pump assembly in both the heating mode and the cooling mode, and wherein the act of controlling is further based on the identified simultaneous heating and cooling demands.

18. The method according to claim 11, wherein the act of controlling comprises running the reversible heat pump assembly in either the heating mode or in the cooling mode for a running time of at least a predetermined number multiplied by a mode change-over time.

19. The method according to claim 11, further comprising:

determining, for the time period and based on the heating demand, a heating duty cycle for the heating mode; and determining, for the time period and based on the cooling demand, a cooling duty cycle for the cooling mode;

wherein the act of controlling comprises, in response to a combination of the heating duty cycle and the cooling duty cycle being below a first threshold, delaying, in time, the setting of the reversible heat pump assembly in the cooling mode, in case of the reversible heat pump assembly is already in the heating mode, or delaying, in time, the setting of the reversible heat pump assembly in the heating mode, in case of the reversible heat pump assembly is already in the cooling mode.

20. The method according to claim 11, further comprising:

determining, for the time period and based on the heating demand, a heating duty cycle for the heating mode; and determining, for the time period and based on the cooling demand, a cooling duty cycle for the cooling mode;
wherein the act of controlling comprises, in response to a combination of the heating duty cycle and the cooling duty cycle being above a second threshold, temporarily setting the heat pump to deliver heat at an output greater than an output being indicated by the heating demand, thereby reducing the heating duty cycle and/or temporarily setting the heat pump to deliver cold at an output greater than an output being indicated by the cooling demand, thereby reducing the cooling duty cycle.

21. The method according to claim 17, further comprising:
in response to identified simultaneous heating and cooling demands, temporarily setting the heat pump to deliver heat at an output greater than an output indicated by the heating demand, thereby reducing the heating duty cycle and/or temporarily setting the heat pump to deliver cold at an output greater than an output indicated by the cooling demand, thereby reducing the cooling duty cycle.

22. The method according to claim 11, further comprising:
associating a heating priority level to the heating demand and a cooling priority level to the cooling demand, wherein the act of controlling is further based on the heating and cooling priority levels.

23. The method according to claim 22,
wherein the act of associating a heating priority level to the heating demand comprises associating a specific heating priority level to a specific heating demand; and/or
wherein the act of associating a cooling priority level to the cooling demand comprises associating a specific cooling priority level to a specific cooling demand.

* * * * *